United States Patent Office 3,049,896
Patented Aug. 21, 1962

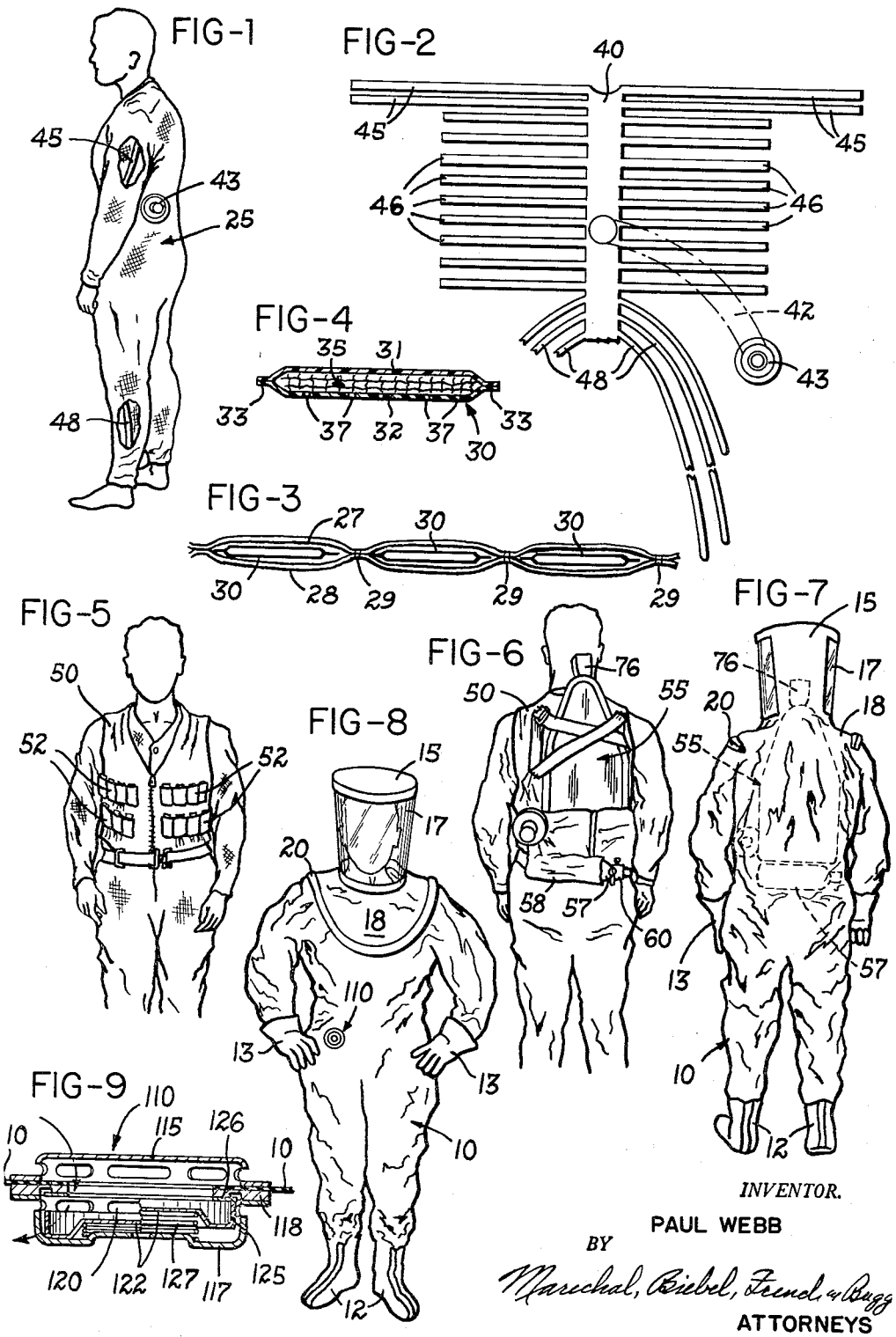
Aug. 21, 1962 — P. WEBB — 3,049,896
PERSONNEL ISOLATION AND PROTECTION SYSTEMS
Filed April 27, 1960 — 3 Sheets-Sheet 1
INVENTOR.
PAUL WEBB
BY Marechal, Biebel, Frend & Bugg
ATTORNEYS

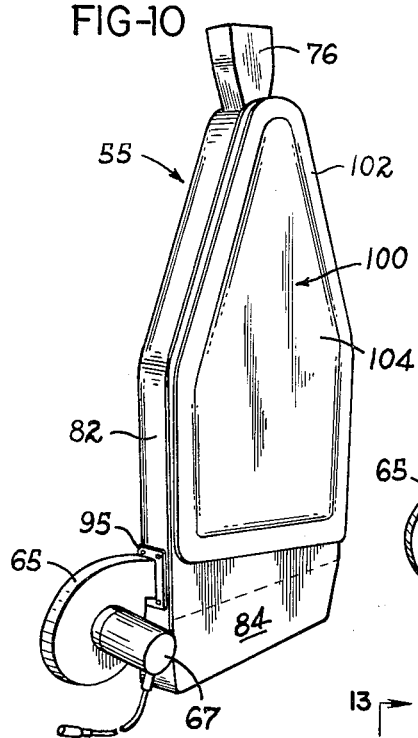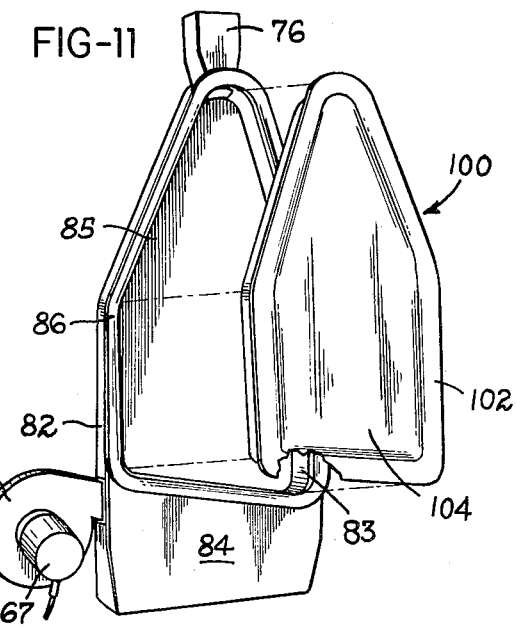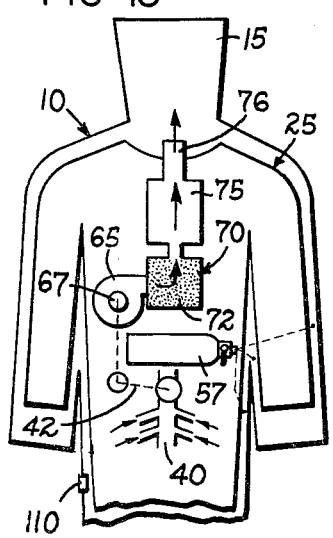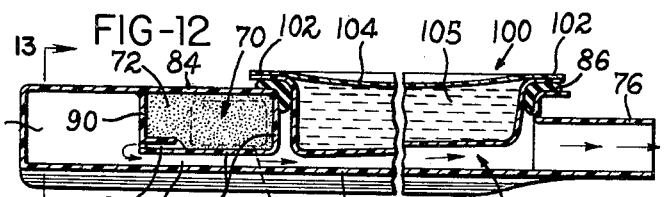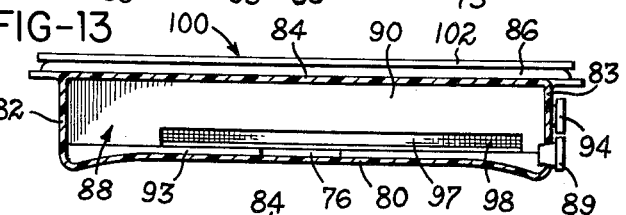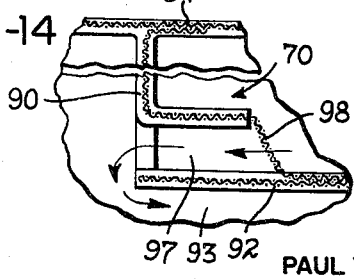
INVENTOR.
PAUL WEBB
BY
Marechal, Biebel, French & Bugg
ATTORNEYS

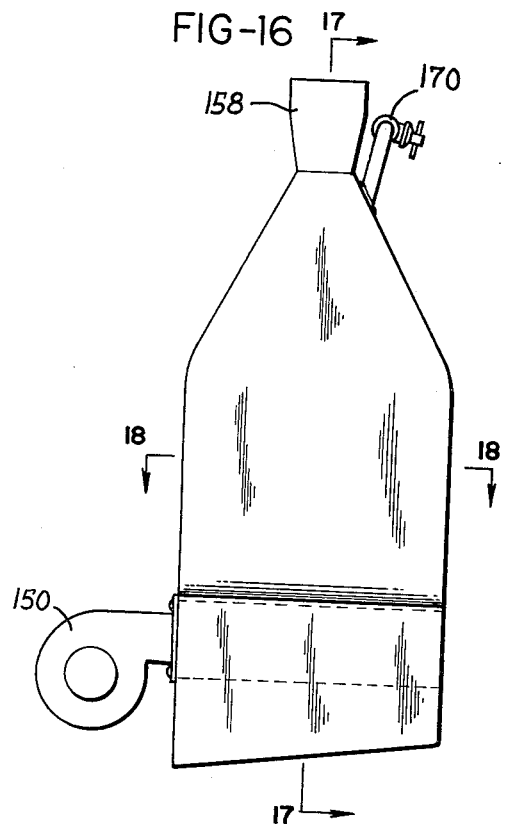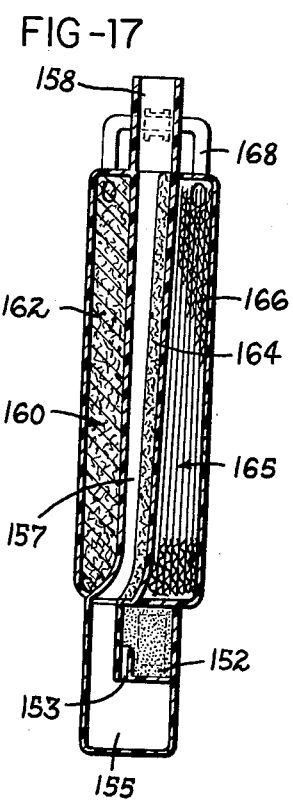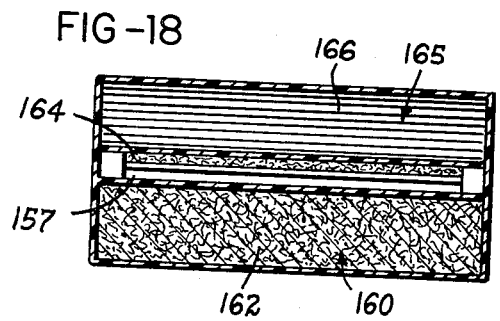

3,049,896
PERSONNEL ISOLATION AND
PROTECTION SYSTEMS
Paul Webb, Yellow Springs, Ohio, assignor to Environment, Incorporated, Yellow Springs, Ohio, a corporation of Ohio
Filed Apr. 27, 1960, Ser. No. 25,105
7 Claims. (Cl. 62—384)

The present invention relates to a system, and apparatus which provides a completely isolated or protected atmosphere for a person, or other animal as may be desired, whereby the person may achieve complete mobility within, and complete isolation from, a surrounding atmosphere which may be dangerous to him for various reasons.

There are many instances where it may be desirable to provide a person with protection from an atmosphere which would be dangerous to his life, while permitting complete mobility of the person within such an atmosphere. Often it is desirable to achieve, along with such mobility, the ability to perform useful work within such a dangerous atmosphere. Typical examples are the cleaning or flushing of the interior of large tanks used to store noxious or poisonous gases or the like, work with poisonous aromatic fuels, work in areas contaminated by radioactive dust or gases, work in closed buildings and spaces where there is heat, lack of oxygen and noxious fumes from smoldering material, or to perform work within an enclosed space filled with an inert gas for some reason, such as to prevent oxidation of special metals being heated and formed in such a space. Many other such uses will suggest themselves to persons skilled in the art.

As noted, the person may be required to perform useful work under such isolated conditions, and thus provision must be made not only for sustaining life, i.e., respiratory functions, but also for further physiological functions, such as dissipation of excess body heat, the evaporation of perspiration, etc. Thus, in order to achieve the desired results, a system such as contemplated by this invention must not only maintain the proper supply of breathable air for the person, but must also provide for heat removal and evaporation of perspiration, and the like, to maintain an approximately correct physiological balance in the person under varying conditions which may be brought about by changes, as through heat absorbed and/or expelled, to the surrounding atmosphere from which the person is protected and isolated.

Therefore, the primary object of this invention is to provide an isolated and completely independent system which will maintain an essentially physiologically correct isolated environment for the person, permitting complete mobility of the person for an extended time within a physically dangerous atmosphere from which the person is isolated.

Another object of the invention is to provide such an isolated system including an outer protective garment which maintains a barrier to a dangerous atmosphere on the exterior thereof, and thus defines interiorly an isolated atmosphere within which the person is protected, together with self-contained air conditioning and reprocessing equipment operable entirely within such outer garment. Power and material for the air conditioning and reprocessing equipment are stored and carried within the isolation system, thus allowing freedom from connecting hoses or cables, and complete freedom and mobility to the wearer.

A further object of the invention is to provide in such a system, together with such air conditioning and reprocessing equipment, a novel inner garment which may be worn by the person and which functions to distribute recirculated air over the torso or trunk and limbs of the person to provide for heat removal, and/or evaporation of perspiration, or other fluids expelled through the skin, as in the course of performing physical work while isolated within the system.

Another object of the invention is to provide a novel portable air conditioning system which will recondition and reprocess air, maintaining the temperature and water vapor content within a bearable range and maintaining the oxygen content at a level sufficient to sustain life comfortably.

Other objects and advantages of the invention will be apparent from the following description, the accompanying drawings and the appended claims.

In the drawings—

FIG. 1 is a view of the inner garment portion of the system, with segments broken away to show duct work contained within the garment;

FIG. 2 is a developed plan view of the anatomical-type distribution or duct system within the inner garment;

FIG. 3 is a sectional view through a portion of the inner garment, showing the arrangement of the fabric thereof containing portions of the duct work;

FIG. 4 is an enlarged detail view of a portion of FIG. 3, showing a segment of the duct work;

FIG. 5 is a view of the front of a person wearing the inner garment, together with a vest mounting power supply batteries and other equipment;

FIG. 6 is a view of the rear of the vest, showing the portable air reconditioning unit mounted thereon;

FIG. 7 is a view taken from the same direction as FIG. 6, showing the outer protective garment enclosing the person together with the inner garment and air reconditioning unit;

FIG. 8 is a view of the front of the outer garment;

FIG. 9 is a sectional view on an enlarged scale, with half of the view illustrating a moved position, of a pressure relief valve which may be incorporated in the outer garment;

FIG. 10 is a perspective view of the novel air recirculating and reconditioning unit provided by the invention;

FIG. 11 is a perspective view from a different angle, exploded to show the manner in which the coolant tank may be removed from the reconditioning unit;

FIG. 12 is a broken longitudinal sectional view on an enlarged scale through the reconditioning unit;

FIG. 13 is a sectional view taken on line 13—13 of FIG. 12;

FIG. 14 is an enlarged section showing details of construction of the reconditioning unit;

FIG. 15 is a schematic diagram of the complete portable isolation system;

FIG. 16 is a front elevational view of a modified air recirculating and reconditioning unit;

FIG. 17 is a vertical sectional view taken on line 17—17 of FIG. 16; and

FIG. 18 is a horizontal section taken on line 18—18 of FIG. 16.

Referring to the drawings, which illustrate a preferred embodiment of the invention, the isolation and protection system in accordance with the invention includes an outer protective suit 10 (FIGS. 7 and 8) which may be formed of material suitable to the use to which the system will be put. For example, if the system is required to protect a person from a poisonous gas, then the outer garment 10 will be of a suitable material coated, impregnated, or otherwise treated with a substance impervious to such gas. Obviously, the protective coating or coatings, as well as the cloth or other fabric employed in the construction of such outer garment will vary with the type of protection desired, and may have heat insulative properties if desired to provide protection of the person from excessive temperatures in the surrounding atmosphere.

The outer garment includes foot covers or boots 12 of somewhat heavier construction, preferably, although not necessarily, constructed as an integral part of the outer garment. In the case of separately formed boots, there of course must be suitable seals between the boot tops and the garment proper. Similarly, the outer garment may include protective gloves 13 which likewise may be formed separately or integrally with the outer garment.

The head covering includes a helmet 15 provided with a transparent visor 17, and carried on a flap 18 which conveniently is integral with the outer garment, preferably across the rear of the shoulders as shown in FIG. 7, and having a sealable detachable connection 20, as in the form of a slide fastener which is fluid tight when closed. This slide fastener preferably extends over the shoulders and arcuately across the upper torso or chest in the outer garment, providing a relatively large opening through which the person may don the garment and take it off. Thus, with the garment in place and all seals completed, the person within the garment is contained in a completely isolated atmosphere which is separated from the surrounding or ambient atmosphere.

The inner garment 25, as shown particularly in FIGS. 1–4, is provided of cloth or similar material having a relatively open weave, such that air can pass therethrough. This garment preferably is formed of two layers of such cloth, namely, an inner layer 27 and an outer or exterior layer 28 (FIG. 3) between which the ducts 30 may be received, and held in place as by stitching 29. Of course, if desired a single layer of cloth may be used for the inner garment and the ducts held in place by strips of cloth fastened thereover, or by other suitable means.

An enlarged section through one of such ducts is shown in FIG. 4, and the duct may preferably be formed from strips of fluid tight plastic material or the like, indicated at 31 and 32, which are heat sealed or otherwise sealed together at their edges 33. A suitable supporting structure is placed interiorly of the ducts, indicated by the general reference numeral 35, and may be provided in the form of any suitable cellular material which is resistant to crushing and will not substantially impede the flow of air through the duct.

One surface of the duct, in the areas where it is desired to flow air over the body surface of the person, is provided with small passages 37, shown as formed in the duct wall 32. The ducts are so arranged within the inner garment that these small passages or openings 37 are directed toward the body when the garment is worn. Thus, air may exit from the duct work and pass over the body surface, or conversely air may be drawn from the body surface into the duct work, as may be desired in a particular usage of the system.

The duct work is arranged within the inner garment in a manner which may conveniently be described as forming an anatomical distribution system. When the garment is worn, the pattern of ducts approximates the anatomical distribution of cutaneous nerves by body segment. A developed view of such duct work is shown in FIG. 2, wherein the trunk duct 40 is connected through a main passage duct 42 to a coupling member 43 which is mounted in the surface of the inner garment, preferably to the rear, as on the central left rear side, shown in FIG. 1. From the central duct 40 the distribution ducts pass into the arms, legs, and around the torso. Thus, the elongated upper ducts 45 may pass downwardly through the arms of the inner garment, the central ducts 46 are wrapped, within the inner garment, about the main torso and trunk, and the lower extended ducts 48 are contained within the legs of the inner garment. Portions of such duct work can be seen in the broken away segments of FIG. 1. While this anatomical distribution arrangement is not essential to the present invention, it is a preferred arrangement, since this system provides the most effective distribution of air over the body, maintaining an essentially uniform air distribution over the body.

Over the inner garment, as shown particularly in FIG. 5, there is worn an equipment supporting vest 50, which may conveniently be constructed of strong porous fabric to permit passage of air therethrough, while at the same time supporting the load of air reconditioning and other auxiliary equipment. As an alternative, the reconditioning equipment may also be suspended on the inner garment, which would be suitably modified by adding pockets and straps to hold the equipment. For example, as shown in FIG. 5, the vest is provided with a plurality of rows of pockets 52 on the front thereof which may carry battery cells. A suitable type of cell for this purpose is a rechargeable 1½ v. silver-zinc battery using an alkaline electrolyte, sometimes known as an Edison battery. These cells have a relatively long useful output life, and are relatively small for the current output which they provide. Of course, other sources of electrical energy, if such is required, may be provided for this purpose.

On the back of the equipment carrying vest, as shown particularly in FIG. 6, is mounted the air reconditioning unit, indicated generally at 55, together with an oxygen or air bottle 57 which is received within a pocket 58 on the vest. A quantity of oxygen gas under pressure is contained therein, and released through a pressure regulator and valve 60 provided at the neck of the bottle 57. In some instances, instead of pure oxygen gas it may be feasible to use compressed air for this purpose, but in any event, the gas is supplied for the purpose of replenishing oxygen in the isolated atmosphere of the system as such oxygen is absorbed by the person therein. The oxygen is merely metered at a desired quantity into the space or isolated atmosphere between the inner and outer garments and will be picked up by the air circulated therebetween and effectively dispersed and circulated through the system.

The system diagram of FIG. 15 illustrates one arrangement of the system, including a schematic representation of the essential units thereof. Thus, air is drawn into the main duct 40 from the branch ducts previously described, and is thence drawn through the connecting duct 42 and into the inlet of a power operated air recirculating blower 65. This blower may conveniently be driven by a small electric motor 67 (FIGS. 6, 10 and 11) which in turn is driven by power derived from the above mentioned batteries 52.

The air drawn into the blower will have passed through the space between the inner and outer garments, and over the body surface of the person. This air, therefore, will have acquired considerable heat from the body, at least some amount of moisture due to evaporation of perspiration and to moisture in the person's exhalations, and also will have some quantity of $CO_2$ exhaled into the system by the person. It is the function of the air reconditioning and reprocessing equipment to remove as much of this $CO_2$ as possible, replenish the absorbed oxygen (which is done separately as mentioned above), and to cool the air to remove a substantial amount of the added heat and to condense as much of the picked-up moisture as is feasible.

These functions are provided by passing the air from the blower 65 through a $CO_2$ removal chamber 70 containing a quantity of $CO_2$ absorbent 72 which may be a dry chemical such as used commercially for anesthesia apparatus, known as "soda limes," or a metallic hydroxide such as lithium or sodium hydroxide. The air is passed through a cooler 75 in which it is cooled and condensed moisture is removed, with the reconditioned air passing through the outlet 76 back into the space between the garments. As shown particularly in FIG. 7, duct work in the inner garment 25 and discharges this air through the reconditioning unit, and thence the cooled and "dehumidified" air is discharged through the outlet 76 into the helmet. In many instances, this flow path will be the most suitable, with cool fresh air directed about the head of the wearer, providing a pleasant feeling which is inducive to comfort. However, in some situations it may be desirable to reverse this recirculation flow.

For example, where the outer garment is treated or otherwise designed or prepared to resist a flow of gas therethrough from the surrounding atmosphere, particularly where such gas may be harmful to personnel, it may be of prime consideration to maintain a positive pressure throughout the isolated atmosphere, particularly in the space between the garments 10 and 25, to resist such leakage flow of gas from without. In such a situation the present invention contemplates a reversal of the blower 65 such that air is drawn in from the helmet to the air reconditioning unit where it is cooled, moisture removed, excess $CO_2$ removed, and the reconditioned cooled air is supplied through the duct work of the inner garment and discharged through the small openings 37 in the duct work over the body of the wearer.

The purpose of this distribution of air flow is the same as before, but directing a pressure flow through the anatomical distribution ducting or system maintains a positive pressure over substantially the entire inside surface of the outer garment. In the case of such reverse flow, the fresh air or oxygen added to the system from the bottle 57 is discharged into the system in the same manner as previously, and effectively mixed with the much larger recirculating flow of the system. A pressure sensing "demand" regulator on the bottle 57 may be used to maintain the least internal suit pressure, which will be at the intake side of the blower, slightly higher than the outside pressure, by allowing gas to flow from storage until the right positive pressure exists. Such demand regulators are conventional.

From the foregoing it will be appreciated that the present invention provides a novel system for maintaining personnel in a completely self-contained and mobile isolated atmosphere, together with provisions for absorption of body heat, exhaled $CO_2$, and supply of fresh air and/or oxygen. Thus, personnel equipped with this system may work comfortably for sustained periods of time completely protected from, and completely mobile within, an atmosphere which is dangerous to such personnel. Furthermore, the invention provides novel portable air reconditioning equipment which is of relatively simple and inexpensive construction, and which is capable of rapid regeneration where it may be desirable to maintain highly specialized, trained personnel at work in dangerous atmospheres for extended periods of time.

By providing more than one coolant tank 100, tanks removed from the air reconditioning unit may be recooled by suitable refrigerating equipment while one of the tanks is in use, and a tank which has warmed in accomplishing its "heat sink" function may be replaced by a cool tank when the personnel wearing the system emerges from the dangerous atmosphere. At the same time, the batteries can be removed and replaced by others which have been recharged in the meantime, a new compressed air or oxygen bottle put in place, fresh $CO_2$ absorbent 72 put in the container 70, and the outer garment resealed upon the wearer so that he may return to his work with a minimum of "down" time where such is an important factor. In some instances, it may even be feasible to provide an entire additional unit or units mounted upon a separate vest 50, such that the wearer could remove at least the top of the outer garment, take off the vest and associated equipment mounted thereon, and replace it with a like vest having recharged equipment. In such instances the coupler 43 may conveniently be provided as a quick-detachable, snap-type coupling for easy and rapid connection with the blower unit.

FIGS. 16–18 show another air reconditioning and recirculating unit which is provided in accordance with this invention. It will be noted, particularly with reference to FIG. 16, that this unit is of essentially the same general outer configuration as the unit previously described. In this device, which again preferably is formed of lightweight and strong materials, such as light sheet metals or other suitable materials, the air is recirculated by a motor driven blower 150 which is connected into a chamber 152 containing a quantity of $CO_2$ absorbent, and air from this chamber flows through the transversely elongate passage 153 into the lower condensate collection chamber 155, and thence the air can flow upwardly to one side of chamber 152 and through a central passage 157 extending medially upwardly of the unit, and essentially the entire width thereof. This passage opens into the upper neck 158 which is positioned to the rear of the wearer's head when in use, in the same manner as shown in FIGS. 6 and 7.

To one side of passage 157 there is formed a completely closed chamber 160 which contains a quantity of hydrophilic wick material 162 which is saturated with water. There are a number of suitable such materials known commercially, one of which may be obtained under the commercial name of Refrasil. On the other side of passage 157, and separated therefrom by a layer of insulation 164, is another closed chamber 165, and in this chamber is a quantity of chemical absorber, for example lithium bromide-treated corrugated paperboard or the like, indicated generally at 166. Chambers 160 and 165 are connected by a cross passage or pipe 168 containing a manually operable valve 170 which may be closed or opened as desired to separate or connect the chambers.

The chambers 160 and 165 are placed under a high internal vacuum, for example in the order of about 9 mm Hg total pressure, and of course the material 162 is initially soaked with water. At this pressure water will vaporize at approximately 50° F., and thus with valve 170 open, warm air circulated through the passage 157 will cause the water to vaporize, and considerable heat will be absorbed as the heat of vaporization of the water. The water vapor will pass through the connecting pipe or passage 168 and will be absorbed by the material 166, which is highly absorbent of the water vapor. Thus, the limit on the cooling capabilities of this system is the ability of the absorber 166 to take up or absorb water vapor. In a system of this type it is readily possible to design a unit for absorption of 1000 B.t.u./hour.

The unit may be regenerated by heating the absorbent material 166 to a temperature at which it will give up the water, in the case of the aforementioned lithium bromide material about 200° F. Due to the high vacuum in the system the flow will be reversed, with the water passing to the hydrophilic wick material 162 in chamber 160, and when regenerating has been accomplished the valve 170 is closed until the unit is again ready for use.

With a cooling unit of this type, it is possible to reverse the cycle, and thus regenerate the unit many times, without removing any parts of the unit. The only requirement is that the chamber 165 of the unit be heated, and this may readily be accomplished by placing a suitable heater, such as an electric heating pad, over the chamber to heat the absorber to the temperature necessary for regeneration.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A protective system for isolating personnel in dangerous atmospheres while maintaining maximum mobility of the personnel, said system comprising an enclosing outer an effective location for this discharge 76 is at the rear of the person's head, inside the helmet 15, since this floods the helmet with a supply of cooled fresh air which is pleasing to the person, and in some cases better for respiration.

All of the foregoing reconditioning and reprocessing functions are performed by novel apparatus in accordance with this invention which is contained entirely within the system, covered by the outer garment 10, and thus completely mobile with the person enclosed in the protective system. The air is recirculated within the system at a rate which may be varied from three up to as much as fifteen cubic feet per minute, the higher rates of flow in this range being used where necessary to maintain thermal balance when there is a sizable heat load on the individual being protected. This portable system is of essentially light weight, so as not to detract from the mobility of the person, and it has been found that such a unit, made for one hour of use in warm conditions up to 100° F., can be constructed with a weight of for example 13 pounds.

The portable air conditioning unit provided by this invention is constructed of relatively sturdy, light-weight material. There are a number of such materials available, and for purposes of illustration the construction will be described in connection with a unit formed of a reinforcing wire mesh over which is laminated one or more layers of glass fiber cloth, the whole being impregnated with a suitable resin, such as a thermosetting polyester.

A preferred arrangement and design of the functional elements which condition the air in sequence is shown. Merging of elements, use of common walls, and reduction of fittings and connecting ducts make for a compact and light weight package.

Referring to FIGS. 10–14, the unit 55 is formed to include a back wall 80 which is contoured to fit the back and shoulders of the person wearing the vest 50, together with integral side walls 82 and 83 and a lower integral front wall 84. In one preferred construction of the unit approximately three quarters of the front wall is provided with a large opening 85, around which a compressible or flexible seal 86 extends, thus forming an open top cooling chamber. This chamber may preferably converge toward the top, and at its apex the discharge duct 76 is formed as an integral member. The lower segment of the unit, when it is in its normal carried position as shown in FIGS. 10 and 11, forms a collection chamber 88 in which condensed moisture may collect esentially out of the normal air flow stream. This chamber is provided with a removable plug 89 (FIG. 13) which may be taken out for purpose of draining the condensed moisture from the unit during periods of non-use.

Immediately above chamber 88 the unit includes further internal walls 90 and 92, the latter extending into the body of the unit from the lower front wall 84 and thence downwardly spaced from the rear wall 80 to define an air passage 93. The walls 90 and 92 also define the $CO_2$ removal chamber 70, and the absorbent material 72 is contained therein. This material may be replenished or renewed through a hole in the side of the chamber normally closed by plug 94 (FIG. 13). The air issuing from blower 65 is directed through an inlet fitting 95 laterally into the chamber 70, and after a substantial quantity of the $CO_2$ in the air stream is removed, the air issues from this chamber througs discharge openings 97 formed by the wall 92 and an inward continuation of the wall 90.

Referring to FIG. 14, this passage is preferably traversed by portions of screening or the like, which may conveniently include portions of the reinforcing mesh left bare as indicated at 98, and serving to retain the material 72 in chamber 70. A suitable arrangement for such wire mesh is apparent from FIG. 14.

The air thus passes through the $CO_2$ absorbent and upwardly through passages 93 into the cooling chamber 75. The coolant is provided in the form of a separate tank 100 which likewise may be formed of wire mesh or the like laminated with glass fiber cloth and impregnated. The body of this tank includes a peripheral lip 102 which is formed to engage in sealing relation with the compressible seal 86, thus enclosing the chamber 75 when the coolant tank is mounted in the unit.

The upper or outer wall 104 of this unit preferably is constructed to be somewhat flexible, for example being normally dished as shown particularly in FIG. 12. A convenient construction for this purpose may be to form such upper tank wall of impregnated cloth, without reinforcing mesh or the like, such that it is liquid tight but still somewhat flexible.

Within the coolant tank there is sealed a quantity of refrigerant liquid or other suitable material 105. A suitable refrigerant may be water with a quantity of ethylene glycol such that the liquid will turn to slush, without freezing solid, when subjected to a low temperature for an extended time.

The air passing through the chamber 75 thus is cooled, and substantial heat is transferred to the coolant tank, and as a consequence of such cooling, moisture is condensed from the cooled air, the condensate flowing downwardly through the passage 93 and collecting at the bottom of chamber 88.

The air volume contained between the outer garment and the body of the wearer is essentially constant as it moves around through the various spaces, ducts, and recondition apparatus described. As the wearer breathes from this volume, he removes oxygen from it and adds carbon dioxide in nearly the same volume. Since the $CO_2$ is continually removed by the absorbent 72, a decrease in this volume would occur if no replacement gas were introduced. Replacement does take place by the addition of oxygen (or air) appropriately metered from the high pressure storage tank 57. In some cases an excess of this replenishing gas is allowed to flow into the suit volume, which would cause the volume to increase, or cause the internal suit pressure to increase, or both. To avoid this, a one way relief valve 110 in the outer suit permits gas to flow out of but not into the suit volume. The relief valve 110 also may vent internal suit gas when movements by the wearer produces reduction in suit volume. The relief valve permits these volume changes without there being an annoying surge of pressure, and if the motion of the wearer tends to increase the suit volume, the relief valve closes due to decreased pressure inside, while the outer suit collapses slightly in response to higher pressure outside.

This valve unit is a conventional item, and may include an inner slotted or perforated cap 115 and an outer cap member 117 joined together, as through a spacer ring 118, to clamp surrounding portions of the outer garment fabric in sealed relation thereto. The outer cap 117 likewise is provided with openings or slots 120 through which the air may exit.

A movable valve member 122 is mounted within the outer cap 117, including a cylindrical sealing part 125 which is normally engaged with a gasket or seat 126 under the influence of a spring 127. If pressure within the system exceeds the outer or atmospheric pressure, the valve member 122 will open against the spring, and air will flow into the surrounding atmosphere from the system until the pressure differential between the interior and exterior again equals the seating force of the spring, at which time the valve will close. Such release of air from the system may also be useful to avoid "ballooning" of the outer garment when the wearer stoops or otherwise moves in the course of his work and reduces the effective volume contained within the outer garment.

The foregoing description is based upon an air flow circulation where the blower 65 withdraws air from the garment of material essentially impermeable to the atmosphere from which protection is desired and adapted to enclose the person completely defining a limited volume therewithin in which biological functioning of the person must be carried out, said outer garment including a transparent visor arranged for positioning opposite the eyes of the wearer providing external visibility for the wearer, passage means for conveying a circulating flow of air through the remote areas of the volume within said outer garment including a trunk duct, an air circulating means connected to circulate air through said duct, a portable power drive for said circulating means wholly contained within said outer garment, an air reconditioning unit including $CO_2$ absorber and a cooling device providing a heat sink for cooling and condensing of excess moisture from the air, means for mounting said reconditioning unit on the person within said outer garment, means directing the air flow induced by said circulating means through said reconditioning unit and into the volume within said garment, and means supplying a makeup quantity of oxygen to the circulating air to maintain a life-sustaining isolated atmosphere within said outer garment for an extended period of time.

2. A protective system for isolating personnel in dangerous atmospheres while maintaining maximum mobility of the personnel, said system comprising an enclosing outer garment of material essentially impermeable to the atmosphere from which protection is desired and adapted to enclose the person defining a limited volume therewithin in which biological functioning of the person must be carried out, said outer garment including a transparent visor arranged for positioning opposite the eyes of the person providing visibility to the exterior, an inner garment permeable to air and having leg and arm covering and a main torso cover, passage means in said inner garment having a plurality of openings distributed over the surface of said inner garment, and arranged to be directed toward the body surface of the person, a trunk duct in said torso cover connected to said passage means, an air circulating means connected to said duct for inducing a flow of air through said volume and said passage means, a portable power drive for said circulating means wholly contained within said outer garment, an air reconditioning unit including a $CO_2$ absorber and a cooling device providing a heat sink for cooling and condensing of moisture from the air, means for mounting said reconditioning unit on the person within said outer garment, means connecting said circulating means in series with said reconditioning unit and said volume between said garments, and means supplying a makeup quantity of oxygen to the circulating air to maintain a life-sustaining isolated atmosphere within said outer garment for an extended period of time.

3. A protective system for isolating personnel in dangerous atmospheres while maintaining maximum mobility of the personnel, said system comprising an enclosing outer garment of material essentially impermeable to the atmosphere from which protection is desired and adapted to enclose the person defining a limited volume therewithin in which biological functioning of the person must be carried out, said outer garment including a transparent visor arranged for positioning opposite the eyes of the wearer providing external visibility for the wearer, an inner garment permeable to air and having leg and arm covering and a main torso cover, passage means in said inner garment having a plurality of inlet openings distributed over the surface of said inner garment and all connecting to a trunk duct in said torso cover to convey a circulating flow of air to the remote areas of the volume between said garments and through said trunk duct, an air circulating means connected to circulate air through said duct, a portable power drive for said circulating means wholly contained within said outer garment, an air reconditioning unit including a $CO_2$ absorber and a cooling device providing a heat sink for cooling and condensing of excess moisture from the air, means for mounting said reconditioning unit on the person within said outer garment, means directing the air flow induced by said circulating means through said reconditioning unit and into the volume between said garments, means supplying a makeup quantity of oxygen to the circulating air to maintain a life-sustaining isolated atmosphere within said outer garment for an extended period of time, and a check valve in said outer garment providing for outflow of air from within said outer garment preventing excess pressure conditions therein.

4. A protective system for isolating personnel in dangerous atmospheres while maintaining mobility of the personnel, said system comprising an enclosing outer garment of flexible material essentially impermeable to the atmosphere from which protection is desired and adapted to enclose the person completely defining a limited volume therewithin, said outer garment including a transparent visor arranged for positioning opposite the eyes of the wearer providing vision to the exterior, passage means extending into the legs and arms of said garment and having a plurality of openings therein arranged to be directed toward the body surface of the wearer for conveying a circulating flow of air through the remote areas of the volume within said outer garment, a removable vest of material capable of passing air flow therethrough, an air circulating means mounted on said vest and connected to circulate air through said passage means and the volume within said outer garment, a portable power drive for said circulating means wholly contained within said outer garment and including a power supply source carried on said vest, means mounted on said vest for supplying a makeup quantity of oxygen to the circulating air, an air reconditioning unit including a $CO_2$ absorber and a cooling device providing a heat sink for cooling and condensing of excess moisture from the circulating air, and means directing the air flow induced by said circulating means through said reconditioning unit.

5. A protective system for isolating personnel in dangerous atmospheres while maintaining mobility of the personnel, said system comprising an enclosing outer garment of flexible material essentially impermeable to the atmosphere from which protection is desired and adapted to enclose the person completely defining a limited volume therewithin, said outer garment including a transparent visor arranged for positioning opposite the eyes of the wearer providing vision to the exterior, an inner garment of relatively loosely woven flexible material capable of passing a flow of air therethrough, said inner garment including leg and arm coverings, passage means secured to said inner garment including said leg and arm coverings and having a plurality of openings therein arranged to be directed toward the body surface of the wearer for conveying a circulating flow of air through the remote areas of the volume within said outer garment, a removable vest of material capable of passing air flow therethrough, an air circulating means mounted on said vest and connected to circulate air through said passage means and the volume within said outer garment, a portable power drive for said circulating means wholly contained within said outer garment and including a power supply source carried on said vest, means mounted on said vest supplying a makeup quantity of oxygen to the circulating air, an air reconditioning unit including a $CO_2$ absorber and a cooling device providing a heat sink for cooling and condensing of excess moisture from the circulating air, and means directing the air flow induced by said circulating means through said reconditioning unit.

6. In a protective system for isolating personnel in dangerous atmospheres, the combination of an enclosing outer garment of material essentially impermeable to the atmosphere from which protection is desired and constructed to enclose the person completely defining a limited volume therewithin, an inner garment of relatively open weave flexible material capable of passing a flow of air therethrough under a relatively small pressure difference, said inner garment including leg and arm coverings and a main torso cover, ducts secured to said inner garment including a main duct mounted on said torso cover and a plurality of branch ducts extending from said main duct along said arm and leg coverings and about said torso covering in an anatomical distribution path, said ducts having a plurality of relatively small openings arranged to be directed toward the body surface of the wearer for conveying a circulating flow of air through the remote areas of the volume between said garments and directly over the body surface of the wearer, means mountable upon the wearer within said outer garment for cooling the circulating air and removing excess moisture therefrom including a portable heat sink member adapted to be reconditioned after an extended period of use, and means mountable over said inner garment including an air circulating device connected to induce a flow of air through said device.

7. A protective system for isolating personnel in dangerous atmospheres while maintaining maximum mobility of the personnel, said system comprising an enclosing outer garment of material essentially impermeable to the atmosphere from which protection is desired and adapted to enclose the person completely defining a limited volume therewithin in which biological functioning of the person must be carried out, said outer garment including a transparent visor providing external visibility for the wearer, passage means for conveying a circulating flow of air through the remote areas of the volume within said outer garment, portable air circulating means wholly contained within said outer garment and connected to circulate air through said passage means causing a forced circulation of air through the volume within said outer garment during use of the system, an air reconditioning unit including $CO_2$ absorber and a cooling device providing heat sink for cooling and condensing of excess moisture from the air within said outer garment, means for mounting said reconditioning unit on the person within said outer garment, means directing the air flow induced by said circulating means through said reconditioning unit and through the volume within said garment, and means maintaining a makeup quantity of oxygen to the circulating air to maintain a life-sustaining isolated atmosphere within said outer garment for an extended period of time.

References Cited in the file of this patent

UNITED STATES PATENTS

| | | |
|---|---|---|
| 2,332,662 | Nathanson | Oct. 26, 1943 |
| 2,429,234 | Miller | Oct. 21, 1947 |
| 2,483,116 | Yarbrough | Sept. 27, 1949 |
| 2,573,414 | Dunn | Oct. 30, 1951 |
| 2,596,178 | Seeler | May 13, 1952 |
| 2,881,758 | Motsinger | Apr. 4, 1959 |